Dec. 4, 1945.　　　　A. R. MILLS　　　　2,390,263
DIE CASTING MACHINE
Filed July 6, 1942　　　　2 Sheets-Sheet 2

INVENTOR
Aubrey Robert Mills
BY
Howard P. King
ATTORNEY

Patented Dec. 4, 1945

2,390,263

UNITED STATES PATENT OFFICE 2,390,263

DIE-CASTING MACHINE

Aubrey Robert Mills, Southgate, London N. 14, England

Application July 6, 1942, Serial No. 449,893
In Great Britain May 20, 1942

6 Claims. (Cl. 22—68)

The present invention relates to die casting machines and more particularly to machines for pressure casting metals and other materials.

There are two types of machines employed for pressure casting metals. In the first type, the nozzle through which the molten metal is extruded into the die protrudes through the platen plate and is held against the die and is not separated therefrom during any portion of the operation. The fact that the platen intervenes between the melting pot and die, acting as a heat shield, and the nozzle is long for extending through the platen and is in contact with the cool die the whole time, makes it necessary for the nozzle to be kept at an excessively high temperature to prevent solidification of the molten metal within the nozzle tip. This high temperature causes rapid corrosion of the nozzle requiring frequent replacement of the nozzle.

In the second type of die casting machine in common use the problem of corrosion is not present to such a degree since the necessity for maintaining the nozzle at such high temperatures is overcome by separating the nozzle and the die between each injection of the molten metal into the die. This operation, however, has a serious disadvantage that the repeated impact between the nozzle and the die when the two are brought together for the next injection operation causes damage to the nozzle tip and consequently necessitates frequent replacement of the nozzle. Furthermore, the addition of the further operation of separating the nozzle and the die reduces speed of output and when the machine is manually operated imposes a further exertion on the operator.

Both types of machines have the disadvantage that the dies are mounted on weight platens which not only reduce the speed of operation of the machine and thus the speed of output but also add to the fatigue of the operator since in the first type of machine one platen has to move between each casting operation and in the second type of machine both platens have to be moved.

Although the chief purpose of the platen is to support the die plates they also serve the purpose of shielding the die plate from the heat of the nozzle and absorbing any heat transmitted to the die since even in the second type of machine the temperature at which the nozzle has to be maintained is of a high order.

An object of the invention is to provide a die casting apparatus in which the nozzle may be held permanently in contact with the die member without using excessive temperatures for maintaining the nozzle at the correct heat.

Another object of the invention is to provide a construction of die casting machine more particularly one which can be operated manually which is capable of being operated at a higher output than previous machines and which is less fatiguing to the operator.

According to the present invention a die casting machine more particularly for manual operation and having a high output includes a die providing a stationary die member and a movable die member, and includes a nozzle fixedly mounted in contact with the stationary die member, means for clamping the stationary die member directly to a fixed part of the machine without the assistance of a platen plate, locking means for supporting the movable die member against the stationary die member and means for operating said locking means and for opening and closing said die.

In a preferred embodiment of the invention the movable die member is slidably mounted on guide rods and moved into the open and closed position with respect to the stationary die member and locked when in the closed position by a knuckle joint, one arm of which is pivotally mounted to the movable die member and the other arm of which is pivotally mounted on a stationary part of the machine and rocked by means of a hand lever.

The invention will now be described with reference to the accompanying drawings in which.

Figure 1:
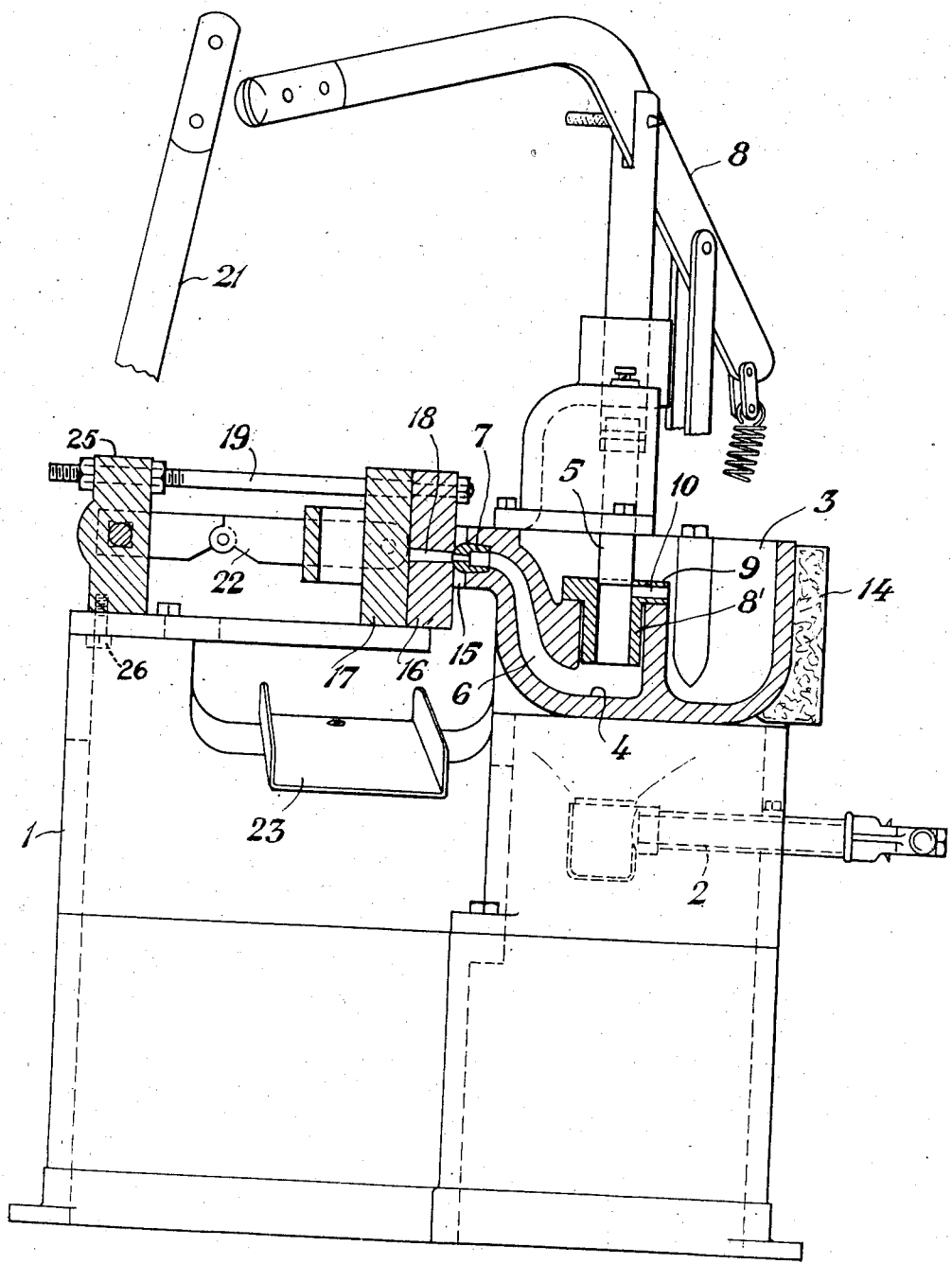
Figure 1 shows partly in section a die casting machine in accordance with the present invention.

The die casting machine is mounted on a pedestal base 1 provided with the usual gas heating flame 2 which is shown diagrammatically as it does not enter into the present invention. Mounted above the gas flame is the pot 3 containing the molten metal to be used for the casting, and provided in the usual manner with a well 4 and a plunger 5 for forcing a charge of molten metal through the goose neck 6 to the nozzle 7. The plunger 5 is operated by the spring loaded lever 8 which is manually operated.

The well 4 is provided with a bushing 8 which fits freely in the well 4 and is provided with a flange 9 at its upper end which flange seats upon the top of the well 4. The flange contains a port 10 for the entry of the molten metal from the pot 3 the plunger 5, of course, in its upper position being lifted free of this port to allow the molten metal to enter the well. The bushing 8 is kept in position by clamps in known manner.

Heat insulating packing material 14 surrounds the pot and goose neck assembly to maintain the heat in the pot.

The gas flame 2 is allowed to play on the bottom of the pot and the lower portion of the goose neck 6. Recessed in the end of the goose neck 6 is the nozzle 7, said nozzle being preferably constructed with a rounded ejection end from which the body of the nozzle tapers to a smaller outside diameter at the metal-receiving end. The upper laterally directed end of the goose neck 6 is constituted as a recess similarly tapered to admit and snugly fit the tapered nozzle portion. This intimate association of the nozzle within the wall or body of the melting pot maintains the nozzle at the temperature of that wall, entirely avoiding the need for separately heating the nozzle. The taper fit of the nozzle within the said recess not only avoids metal leakage at the joint, as well as maximum heat conduction thereto, but also enables the nozzle to be quickly and readily replaced when necessary. Internally the nozzle has a constricted passage which flares toward the ejection end at the rounded part of the nozzle, said passage being relatively short and substantially equal in length to the radius of curvature of the rounded end.

The die consists of the die members 16 and 17, the die member 16 being fixedly secured to abut against the nozzle 7 so that the latter projects into the sprue hole 18 in the die member 16. It will be noticed that no platen plate is employed between the nozzle 7 and the die member 16 although the die member 16 is kept permanently in contact with the nozzle 7 by means of cleats 24 the outer ends of which engage against ribs 15 provided for that purpose on the pot 3. The fixed die member 17 is therefore next adjacent to the melting pot and not heat-shielded therefrom by any intervening platen.

Die member 17 is mounted for reciprocating movement on guide rods 19 and 20 each of which passes through the fixed die member 16 and is opened and closed with respect to the die member 16 by the toggle lever 21 operating the toggle knuckle joint 22 (one link of which is connected to back plate 25 and the other link of which is connected to the die member 17). This knuckle joint also serves to lock the die member 17 against the die member 16 in the closed position as shown in Figure 1.

Figure 2:
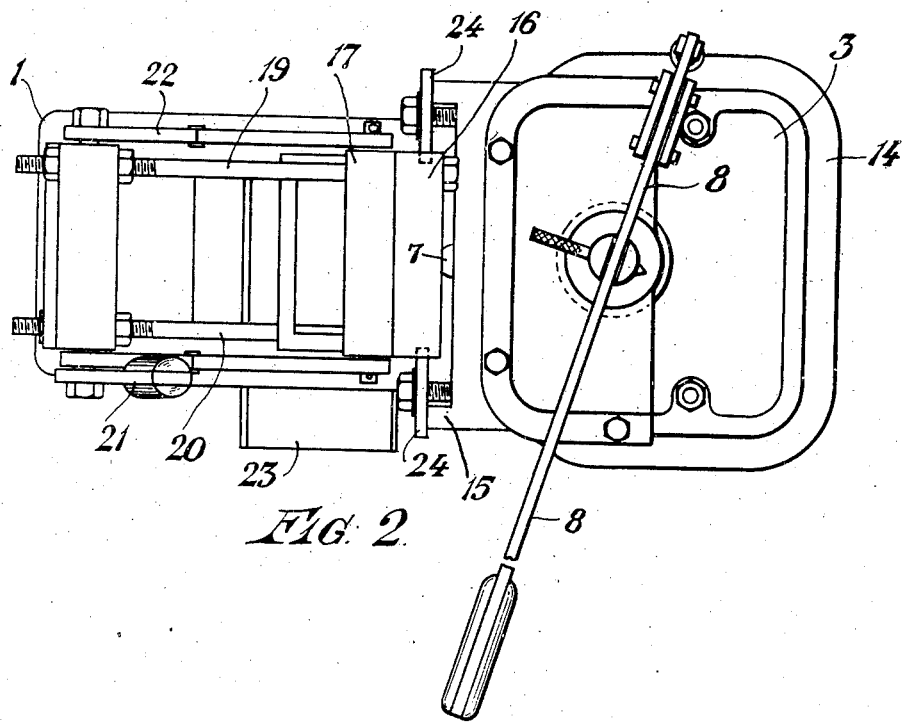
Figure 2 shows a plan of the machine shown in Figure 1.

As shown in Figure 2 of the drawings, the back plate is separably mounted on the frame 1 by means of a locking screw 26, and itself, mounts one end of the toggle knuckle joint 22 and one end of the guide rods 19 and 20, so that by withdrawing locking screw 26 and locking cleats 24, the entire die assembly comprising the associated dies 16 and 17, the back plate 25, the toggle knuckle joint 22, the toggle lever 21 and the guide rods 19 and 20 is readily removed as a single unit.

After a charge has been injected into the die, the die is opened by operation of lever 21 and the casting is ejected to fall into the chute 23 which delivers it to a tray or other receptacle.

By using the nozzle shown, and providing adjacency of the fixed die member and pot as shown and described, and the distribution of heat of the gas flame on both the melting pot and the goose neck 6 integral therewith, special gas heating for the goose neck and the nozzle is rendered unnecessary and any solidification of the molten metal within the diverging tip of the nozzle is withdrawn on the end of the sprue on the casting itself. Since the nozzle can be run at a very much lower temperature than the normal nozzle this has to be replaced only at long intervals instead of at frequent intervals in the case of existing die casting machines. When, however, replacement is necessary all that is required is for the die member 16 to be unbolted from its position and a new nozzle fitted.

Thus, in addition to the many other advantages the apparatus of the present invention reduces the operations for molding to two, namely, the injection of the molten materials into the die cavity and the breaking of the die by moving only one member of the die when the casting either drops out or is ejected.

I claim:

1. In a die-casting machine, a frame, a melting pot carrying molten metal mounted thereon, a goose neck formation integral with said melting pot, a removable nozzle seated in the free end of said goose neck, a die-assembly, clamping means on said melting pot for mounting said die assembly into juxtaposition against said nozzle and a pump for feeding molten metal from the melting pot through the nozzle into said die-assembly.

2. In a die-casting machine, a frame, a melting pot carrying molten metal mounted thereon, a goose neck formation integral with said melting pot, a removable nozzle seated in the free end of said goose neck, a die-assembly, clamping means on said melting pot for mounting said die assembly into juxtaposition against said nozzle and a pump for feeding molten metal from the melting pot through the nozzle into said die-assembly, and heating means below the melting pot and acting upon said melting pot and said goose neck for maintaining the metal therein in flowable state.

3. In a die-casting machine, a frame, a melting pot carrying molten metal mounted thereon, a goose neck formation integral with said melting pot, a removable nozzle seated in the free end of said goose neck, a die assembly comprising a fixed and a movable die, clamping means on said melting pot for mounting said fixed die in juxtaposition against said nozzle, means for displacing said movable die into and out of juxtaposition with said fixed die and a pump for feeding molten metal from the melting pot through the nozzle into said die assembly.

4. In a die-casting machine, a frame, a melting pot carrying molten metal mounted thereon, a goose neck formation integral with said melting pot, a removable nozzle seated in the free end of said goose neck, a die assembly comprising a fixed and a movable die, clamping means on said melting pot for mounting said fixed die into juxtaposition against said nozzle, guide means mounted in said fixed die and means connected with said movable die for reciprocating said movable die along said guide means into and out of juxtaposition with said fixed die and a pump for feeding molten metal from the melting pot through the nozzle into the die assembly.

5. In a die-casting machine, a frame, a melting pot carrying molten metal mounted thereon, a goose neck formation integral with said melting pot, a removable nozzle seated in the free end of said goose neck, a die assembly comprising a fixed die and a movable die, clamping means on said melting pot for mounting said fixed die into juxtaposition against said nozzle, guide means mounted on said frame and extending through said fixed die, toggle means mounted on said frame and operably connected at its free end with said movable die for reciprocating said movable die along said guide means into and out of juxtaposition with said fixed die, and a pump for feeding molten metal from the melting pot through the nozzle into said die assembly.

6. In a die-casting machine, a frame, a melting pot carrying molten metal mounted thereon, a goose neck formation integral with said melting pot, a removable nozzle seated in the free end of said goose neck, a die assembly comprising a fixed die and a movable die, clamping means on said melting pot for separably mounting said fixed die in juxtaposition with said nozzle, guide means separably mounted on said frame and connected with said fixed die toggle means separably mounted on said frame and operably connected at its free end with said movable die for reciprocating said movable die along said guide means into and out of juxtaposition with said fixed die, said die assembly, said guide and toggle means associated therewith defining a reciprocable unit in relation to said frame and melting pot thereof, and a pump for feeding molten metal from the melting pot through the nozzle into said die assembly.

AUBREY ROBERT MILLS.